Jan. 15, 1946.   E. A. KOPS ET AL   2,393,110
SHIMMY DAMPER FOR AIRPLANE LANDING GEARS
Filed Feb. 6, 1945   4 Sheets-Sheet 3

INVENTOR.
Earl A. Kops, Daniel S. Sanborn &
by Virgil A. Johnson

George Douglas Jones
ATTORNEY.

Jan. 15, 1946.   E. A. KOPS ET AL   2,393,110
SHIMMY DAMPER FOR AIRPLANE LANDING GEARS
Filed Feb. 6, 1945   4 Sheets-Sheet 4

INVENTOR.
Earl A. Kops, Daniel S. Sanborn &
BY Virgil A. Johnson
George Douglas Jones
ATTORNEY.

UNITED STATES PATENT OFFICE 2,393,110

SHIMMY DAMPER FOR AIRPLANE LANDING GEAR

Earl A. Kops, Daniel S. Sanborn, and Virgil A. Johnson, San Diego, Calif., assignors to The Ryan Aeronautical Co., San Diego, Calif., a corporation of California Application February 6, 1945, Serial No. 576,400

6 Claims. (Cl. 244—100)

This invention relates to a shimmy damper for airplane landing gear particularly adapted for use in connection with the nose wheel of tricycle landing gear or the like.

This shimmy damper is more particularly adapted for use in connection with nose wheels of airplanes which must be turned a considerable degree in each direction. Most shimmy dampers of this type limit the turning angle of the nose wheel to very long turning radii. In this shimmy damper arrangement, two cylinders are connected in series providing approximately 110 degrees swivel of the nose wheel. Such an arrangement is particularly useful in connection with airplanes based on aircraft carriers at sea and is also very advantageous in maneuvering airplanes in hangars or the like.

Referring to the accompanying drawings.

Similar characters of reference refer to similar parts and portions throughout the several views of the drawings.

Figure 1:
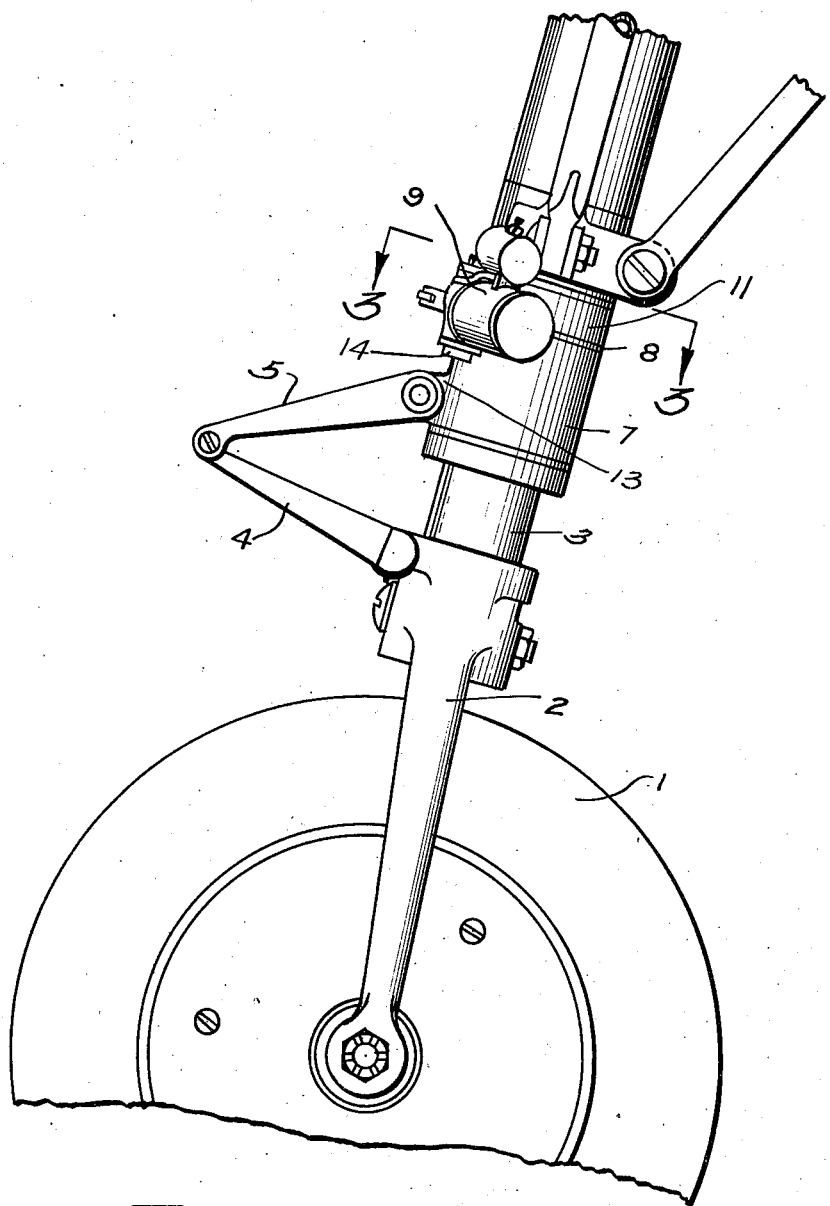
Fig. 1 is a fragmentary side elevational view of an airplane nose gear showing the shimmy damper in connection therewith.

The nose wheel 1, wheel fork 2, plunger 3, torque arms 4 and 5, shock strut cylinder 6, sleeve 7, ring 8, cylinders 9 and 10, and the bracket 11, constitute the principal parts and portions of the nose gear shimmy damper.

Figure 2:
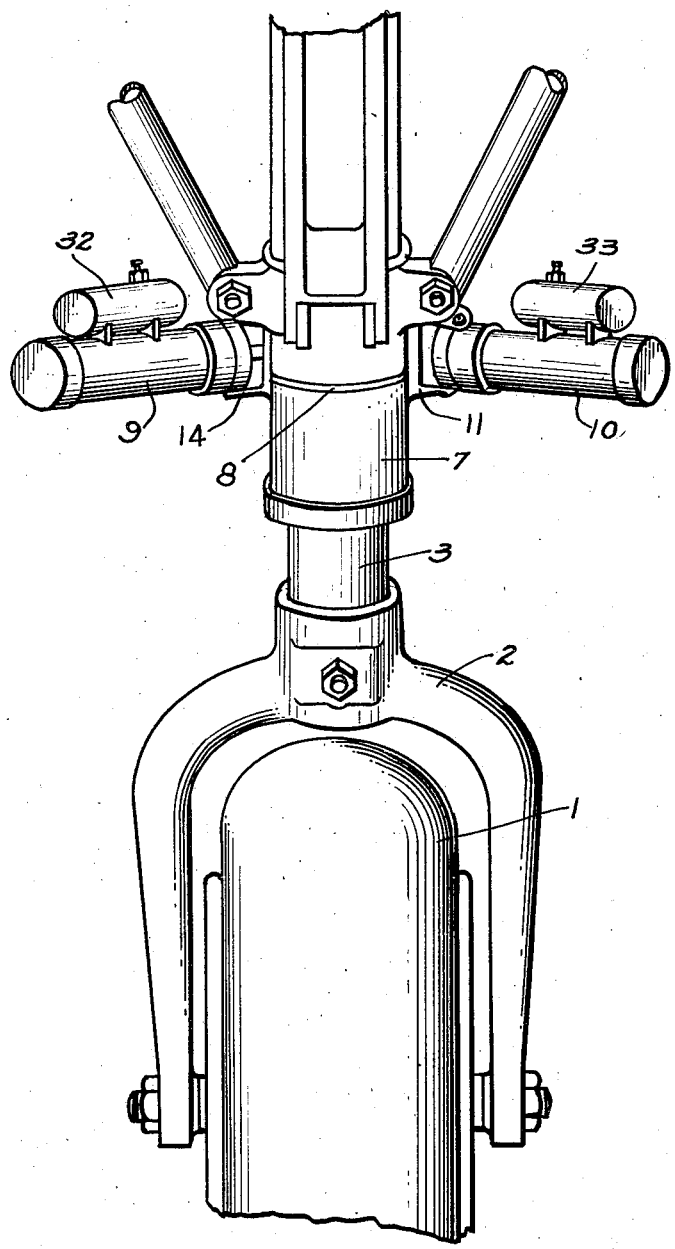
Fig. 2 is a fragmentary rear view thereof.

The nose wheel 1 is substantially conventional and is mounted in the wheel fork 2 shown best in Figs. 1 and 2 in the drawings. Rigidly connected with this wheel fork 2 is the conventional shock strut plunger 3 reciprocally mounted in the shock strut cylinder 6. Rotatably mounted on the outer side of the shock strut cylinder 6 on the bushing 12 is the sleeve 7.

Integral with the sleeve 7 is the torque arm boss 13, pivotally connected with which is the torque arm 5 hinged to the torque arm 4, which is pivotally mounted in connection with the wheel fork 2. These torque arms 4 and 5 permit reciprocal motion of the plunger 3 and the shock strut cylinder 6 and convey torque from the nose wheel 1 to the sleeve 7. Also integral with this sleeve 7 is the cylinder mounting bracket 14, in which the trunnions 15 and 16 engage the shimmy damper cylinder 9 in recesses 17 and 18 respectively. In this manner, the shimmy damper cylinder 9 is pivotally mounted in connection with the bracket 14 and is rotatively shiftable about the shock strut cylinder 6 in conformance with the turning of the nose wheel 1 as shown by dash lines in Fig. 3 of the drawings.

The shimmy damper cylinder 10 is provided with recess portions 19 and 20 which are engaged by the trunnions 21 and 22 respectively on the bracket 11, which is rigidly connected with the shock strut cylinder 6, and retained against revolution thereon.

Figure 3:
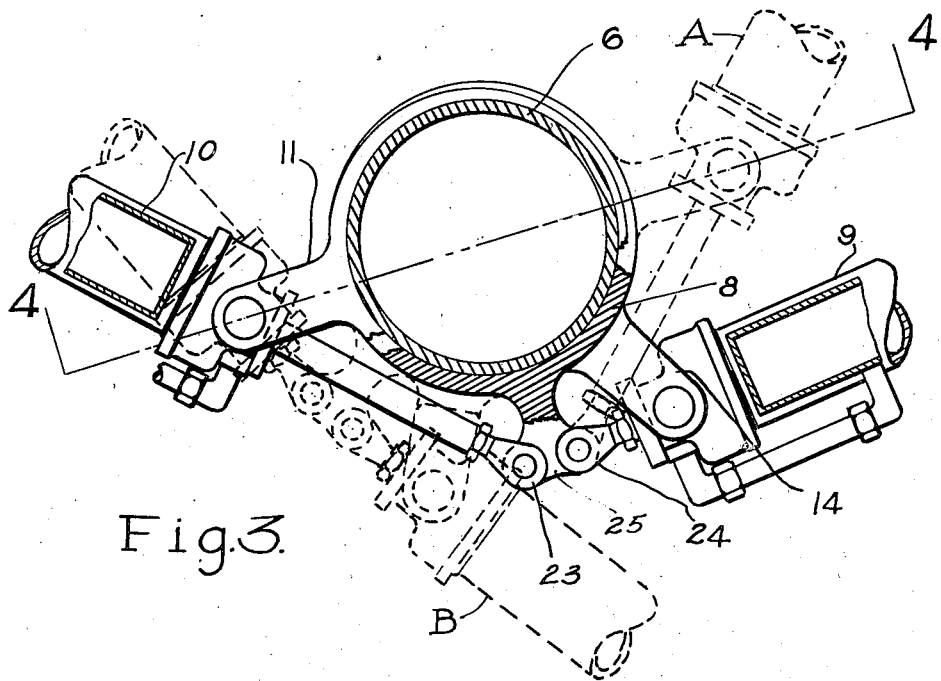
Fig. 3 is an enlarged fragmentary sectional view taken from the line 3—3 of Fig. 1 showing by dash lines two varying positions of one of the shimmy damper cylinders in connection therewith.
Figure 4:
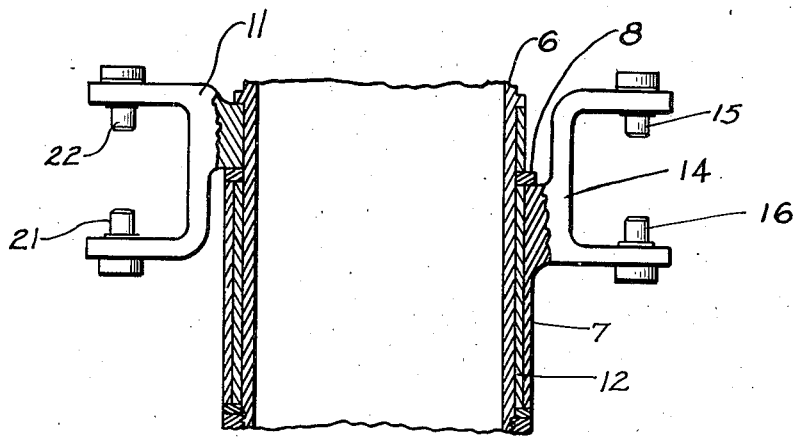
Fig. 4 is a fragmentary sectional view taken from the line 4—4 of Fig. 3 showing one of the cylinder trunnion brackets located substantially 60 degrees from the position as shown in Fig. 3.

As shown in Fig. 3 of the drawings, this shimmy damper cylinder 10 is free to pivot in conformance with the changing position of the shimmy damper cylinder 9. A plunger clevis 23 of the shimmy damper cylinder 10 and the plunger clevis 24 of the shimmy damper cylinder 9 are interconnected by the radial extension 25 of the ring 8, which is rotatably mounted on the shock strut cylinder 6. Thus this ring 8 acts as an idler between the shimmy damper cylinders 9 and 10 and serves to connect these cylinders in series so that the overall travel of the plungers in both of these cylinders is linked together in order to provide 110 degrees rotative turning movement of the nose wheel 1.

It will be here noted that the cylinder 9 is connected with the nose wheel through the torque arms 4 and 5 while the shimmy damper cylinder 10 is maintained against rotative movement on the shock strut cylinder 6.

Figure 5:
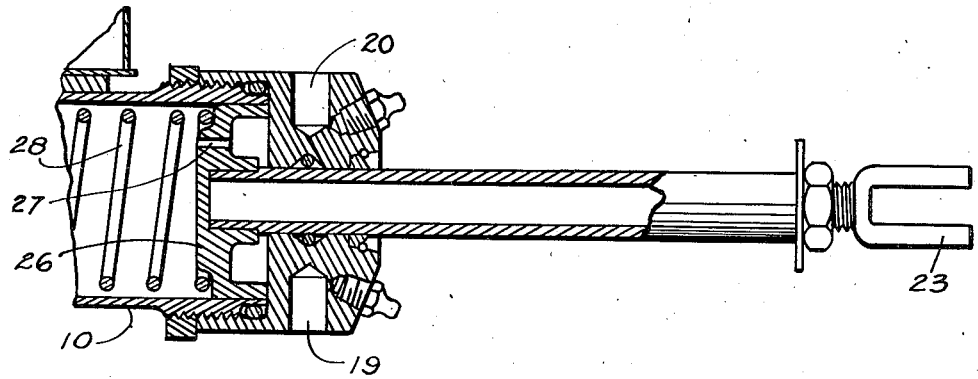
Fig. 5 is an enlarged fragmentary sectional view of one of the shimmy damper cylinders.
Figure 6:
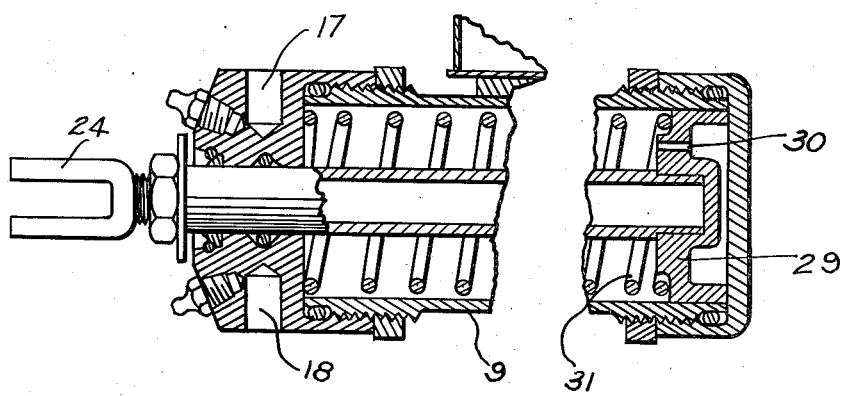
Fig. 6 is an enlarged fragmentary sectional view of the other shimmy damper cylinder.

The shimmy damper cylinder 10 as shown in Fig. 5 of the drawings is provided with a plunger piston 26 having an orifice 27 therein arranged to bypass fluid for dampening high frequency vibration of the nose wheel 1.

Engaging one side of this plunger piston 26 is the spring 28 tending to extend the plunger clevis 23 all as shown best in Fig. 5 of the drawings. The shimmy damper cylinder 9 is provided with a plunger piston 29 having an orifice 30 for the bypass of fluid and engaging this plunger piston 29 is a spring 31, which tends to retract the plunger clevis 24.

As shown in Fig. 3 of the drawings, the clevis 23 is in its normal extended position and the clevis 24 is in its normal retracted position in accordance with spring tension of the two springs 28 and 31.

The operation of this shimmy damper for airplane landing gear is substantially as follows: When the airplane to which this shimmy damper is connected is landing, the high frequency vibration of the nose gear is dampened by fluid in the shimmy damper cylinders 9 and 10 by the restricted orifices 27 and 30 in the plunger pistons 26 and 29. The springs 28 and 31 tend to hold the nose gear in parallel alignment with the longitudinal axis of the airplane as shown in Fig. 3 of the drawings. When towing the airplane or maneuvering the same in a hangar or deck of an aircraft carrier, only one of the springs 28 or 31 is compressed during a turn in either direction, for example, the dash line position A in Fig. 3 of the drawings illustrates a left-hand turn of the nose gear approximating an angle of 55 degrees. In this case, only the spring 31 is compressed due to the extension of the plunger and clevis 24 relatively to the shimmy damper cylinder 9. This is accomplished by the turning of the nose wheel 1 and resultant rotative movement of the sleeve 7 and bracket 14 in connection therewith.

In making a right-hand turn as shown by the dash line position B in Fig. 3 of the drawings, the sleeve 7, together with the bracket 14, rotates in conformance with the turning movement of the nose wheel 1, and the spring 28 is compressed due to the retraction of the plunger clevis 23 in connection therewith; thus the turning operation of the nose wheel 1 is resisted by only one of the springs 28 or 31, and the shimmy dampening operation is effected by both the fluid orifices 27 and 30 in the plunger pistons 26 and 29. Fluid is supplied to the shimmy damper cylinders 9 and 10, by conventional fluid reservoirs 32 and 33 positioned on the upper sides of these shimmy damper cylinders 9 and 10 and connected to one end of each by tubular conductors.

Other embodiments of the invention employing the same or equivalent principle may be used and structural changes made as desired by those skilled in the art without departing from the present invention, and within the spirit of the appended claims.

Having thus described my invention what I claim as new and desire to secure by Letters Patent is:

1. In a shimmy damper for landing gear of aircraft, a shock strut cylinder, a plunger reciprocally mounted therein, having a landing wheel in connection therewith, hinged torque arms connected with said plunger, a sleeve rotatably mounted on said shock strut cylinder and connected with said torque arms, a bracket rigidly connected with said shock strut cylinder, a first shimmy damper cylinder pivotally connected to said bracket, a second shimmy damper cylinder pivotally connected to said sleeve, a ring rotatably mounted on said shock strut cylinder, plungers in connection with said first and second shimmy damper cylinders interconnected by said ring.

2. In a shimmy damper for aircraft landing gear, first and second shimmy damper cylinders, a bracket stationarily mounted in connection with said airplane landing gear supporting said first shimmy damper cylinder, a second bracket rotatably mounted relative to the axis of said landing gear and supporting said second shimmy damper cylinder, a ring rotatably mounted on said landing gear and plungers in connection with both of said first and second shimmy damper cylinders interconnected by said ring.

3. In a shimmy damper for aircraft landing gear, first and second shimmy damper cylinders, a bracket stationarily mounted in connection with said airplane landing gear supporting said first shimmy damper cylinder, a second bracket rotatably mounted relative to the axis of said landing gear and supporting said second shimmy damper cylinder, a ring rotatably mounted on said landing gear and plungers in connection with both of said first and second shimmy damper cylinders interconnected by said ring, torque arms in connection with said second bracket arranged to control the turning movement of the wheel of said landing gear.

4. In a shimmy damper for aircraft landing gear, first and second shimmy damper cylinders, a bracket stationarily mounted in connection with said airplane landing gear supporting said first shimmy damper cylinder, a second bracket rotatably mounted relative to the axis of said landing gear and supporting said second shimmy damper cylinder, a ring rotatably mounted on said landing gear and plungers in connection with both of said first and second shimmy damper cylinders interconnected by said ring, springs in said first and second shimmy damper cylinders, and cooperating with the plungers in said first and second shimmy damper cylinders, the spring in one of said shimmy damper cylinders arranged to extend the plunger thereof, the spring in the other shimmy damper cylinder arranged to retract the plunger thereof, pistons in connections with the plunger of each shimmy damper cylinder having fluid by pass orifices, therein and fluid in each of said shimmy damper cylinders.

5. In a shimmy damper for aircraft landing gear, first and second shimmy damper cylinders, a bracket stationarily mounted in connection with said airplane landing gear supporting said first shimmy damper cylinder, a second bracket rotatably mounted relative to the axis of said landing gear and supporting said second shimmy damper cylinder, a ring rotatably mounted on said landing gear and plungers in connection with both of said first and second shimmy damper cylinders interconnected by said ring, pistons in connection with the plungers of said first and second shimmy damper cylinders having orifices therein and fluid in each of said shimmy damper cylinders.

6. In a shimmy damper for aircraft landing gear, first and second shimmy damper cylinders, a bracket stationarily mounted in connection with said airplane landing gear supporting said first shimmy damper cylinder, a second bracket rotatably mounted relative to the axis of said landing gear and supporting said second shimmy damper cylinder, a ring rotatably mounted on said landing gear and plungers in connection with both of said first and second shimmy damper cylinders interconnected by said ring, said first and second shimmy damper cylinders each pivotally connected to said first and second brackets.

DANIEL S. SANBORN.
EARL A. KOPS.
VIRGIL A. JOHNSON.